US006740447B1

(12) United States Patent
Keshishian

(10) Patent No.: US 6,740,447 B1
(45) Date of Patent: May 25, 2004

(54) CHARGE STORAGE DEVICES WITH OVERLAPPING, FOLDED ELECTRODES

(75) Inventor: Sarkis Minas Keshishian, Ermington (AU)

(73) Assignee: Energy Storage Systems PTY LTD, Ryde (AU)

( * ) Notice: Subject to any disclaimer, the term of this patent is extended or adjusted under 35 U.S.C. 154(b) by 0 days.

(21) Appl. No.: 09/673,083

(22) PCT Filed: Apr. 15, 1999

(86) PCT No.: PCT/AU99/00278

§ 371 (c)(1), (2), (4) Date: Oct. 31, 2000

(87) PCT Pub. No.: WO99/53510

PCT Pub. Date: Oct. 21, 1999

(30) Foreign Application Priority Data

Apr. 15, 1998 (AU) .............................. PP2972

(51) Int. Cl.[7] ......................... H01M 4/66; H01M 10/14
(52) U.S. Cl. ..................... 429/178; 429/213; 429/245
(58) Field of Search ..................... 429/178, 194, 429/213, 245

(56) References Cited

U.S. PATENT DOCUMENTS

| | | | | |
|---|---|---|---|---|
| 4,830,940 A | * | 5/1989 | Keister | 429/194 |
| 4,948,685 A | * | 8/1990 | Ohsawa | 429/213 |
| 4,964,877 A | * | 10/1990 | Keister | 29/623.1 |
| 5,478,668 A | * | 12/1995 | Gozdz | 429/127 |
| 5,552,239 A | * | 9/1996 | Gozdz | 429/94 |
| 5,911,947 A | * | 6/1999 | Mitchell | 429/623.2 |
| 6,045,943 A | * | 4/2000 | Nowaczyk | 429/160 |

FOREIGN PATENT DOCUMENTS

| | | | | |
|---|---|---|---|---|
| EP | 512828 | * | 1/1997 | ............ H01M/6/10 |
| GB | 2129191 | * | 5/1984 | ........... H01B/10/06 |
| JP | 56-027914 | | 3/1981 | |

OTHER PUBLICATIONS

Patent Abstracts of Japan, E961, p. 101, JP 02-130907 A (Nichicon Corp), May 18, 1990.
Patent Abstracts of Japan, E 1464, p. 106, JP 05-205981 A (Matsushita Electric Ind Co Ltd), Aug. 13, 1993.
Derwent Abstract Accession No. 85-103010/17, JP 60-049620 A (Matsushita Electric Ind KK) Mar. 18, 1985.
Patent Abstracts of Japan, jp 08-293435 A (Matsushita Electric Ind Co Ltd) Nov. 5, 1996.
Derwent Abstract Accession No. 93-170349/21, JP 05-101977 A (Kenwood Corp) Apr. 23, 1993.

* cited by examiner

Primary Examiner—Mark Ruthkosky
(74) Attorney, Agent, or Firm—Kenyon & Kenyon

(57) ABSTRACT

A charge storage device includes a layered strip which is folded lengthways along fold lines (14, 15) in the directions indicated by arrows (16, 17) to form a folded layered strip (18). Strip (18) is then cut to a predetermined length (19). After the proportions of activated and conductive carbon, and the thickness of the paste, have been settled the length to which strip (18) is cut is the final determining factor for the capacitance, time constant, power density and energy density of the charge storage device. The cut length (19) is then folded crossways along fold lines (20, 21) in the directions indicated by respective arrows (22, 23) to form a twice folded structure (24).

41 Claims, 8 Drawing Sheets

CHARGE STORAGE DEVICES WITH OVERLAPPING, FOLDED ELECTRODES

FIELD OF THE INVENTION

The invention relates to a charge storage device.

The invention has been developed primarily for super capacitors and will be described hereinafter with reference to that application. It will be appreciated, however, that the invention is not limited to that particular field of use and is also applicable to other charge storage devices.

Electric double layer capacitors store charge in the large surface area of the electric double layer which is formed between activated carbon and an electrolyte. Typically, activated carbon powder is combined with a fluoride resin and methanol to make a paste. The paste is spread on aluminium foil and allowed to dry, to form electrodes. The electrodes are wound with a separator, impregnated with electrolyte and sealed into a container. Terminals connected to respective, electrodes and extending outside the container complete the capacitor.

SUMMARY OF THE INVENTION

According to a first aspect of the invention there is provided a charge storage device including:

a first longitudinally extending sheet electrode;

a second longitudinally extending sheet electrode disposed adjacent to the first electrode and being folded together with the first electrode along a longitudinal fold line and a transverse fold line;

a porous separator disposed between adjacent electrodes: and a sealed package for containing the electrodes, the separator and an electrolyte, whereby the first electrode is electrically connected to a first terminal and the second electrode is electrically connected to a second terminal, both the first and second terminals extending from the package to allow electrical connection to the respective electrodes.

According to a second aspect of the invention there is provided a charge storage device including:

a first longitudinally extending sheet electrode;

a second longitudinally extending sheet electrode disposed adjacent to the first electrode and being folded together with the first electrode along two spaced apart transverse fold lines;

a porous separator disposed between adjacent electrodes: and a sealed package for containing the electrodes, the separator and an electrolyte, whereby the first electrode is electrically connected to a first terminal and the second electrode is electrically connected to a second terminal, both the first and second terminals extending from the package to allow electrical connection to the respective electrodes.

Preferably, in the second aspect, the first and second electrodes are folded together along a longitudinal fold line.

Preferably, the first and second electrodes are folded together along a plurality of spaced apart longitudinal fold lines and a plurality of spaced apart transverse fold lines. Even more preferably, the first and second electrodes are folded together along two spaced apart longitudinal fold lines and two spaced apart transverse fold lines in a Z configuration.

Preferably also, the first and the second sheet electrodes include respective outwardly extending tabs which are electrically connected to respective first and second terminals. More preferably, the tabs extend transversely outwardly from the respective electrodes. Even more preferably, the respective tabs extend outwardly away from each other.

In a preferred form each electrode includes two longitudinal edges and two transverse edges extending between the longitudinal edges wherein the tabs extend centrally outwardly from one of the respective longitudinal edges.

Preferably, a plurality of like pairs of first and second sheet electrodes, together with the intermediate separators, are disposed within the package and connected in parallel to the first and second terminals.

According to a third aspect of the invention there is provided a method of manufacturing a charge storage device including the steps of:

providing a first longitudinally extending sheet electrode;

disposing a second longitudinally extending sheet electrode adjacent to the first electrode;

folding the second electrode together with the first electrode along a longitudinal fold line and a transverse fold line;

disposing a porous separator between adjacent electrodes: and sealing the electrodes, the separator and an electrolyte in a package such that the first electrode is electrically connected to a first terminal and the second electrode is electrically connected to a second terminal, whereby both the first and second terminals extend from the package to allow electrical connection to the respective electrodes.

According to a fourth aspect of the invention there is provided a method of manufacturing a charge storage device including the steps of:

providing a first longitudinally extending sheet electrode;

disposing a second longitudinally extending sheet electrode adjacent to the first electrode;

folding the second electrode together with the first electrode along two spaced apart transverse fold lines;

disposing a porous separator between adjacent electrodes: and sealing the electrodes, the separator and an electrolyte in a package such that the first electrode is electrically connected to a first terminal and the second electrode is electrically connected to a second terminal, whereby both the first and second terminals extend from the package to allow electrical connection to the respective electrodes.

According to another aspect of the invention there is provided a method of manufacturing a charge storage device including the steps of:

(a) applying a coating containing a predetermined proportion of activated carbon, in a predetermined thickness, over an area which extends lengthways along a strip of conductive foil to form a strip electrode. The application may take place by printing, coating dry-applying and fusing. The coating may be a paste, ink or other compound. The coating will typically comprise a paste having a composition of about 80% activated carbon, about 20% conductive carbon and between 3 and 15% binder, but these proportions may vary widely. The coating will usually be between 1 and 500 microns thick, or more particularly between 10 and 300 microns thick, and it may be applied to one or both sides of the foil. The foil will likely be aluminium but could be any other suitable conductive material such as copper or a conductive plastics material. The foil or other conductive material may be pre-treated to enhance its conducting, adhesive or other properties.

(b) sandwiching an insulating separator between the coated regions on two strip electrodes to form a layered strip. The sandwich may be formed with any suitable insulating separator, depending of the type of electrolyte to be used. A porous membrane of plastics material will often be used. The two strips of foil may be shaped or placed such that part of each extends out of the dimensions of the sandwich to be conveniently accessible for connection to an electrical terminal;

(c) folding the layered strip lengthways to form a folded layered strip. The strip may be folded once to make a double thickness, or it may be folded several times. A double fold in the form of a "Z" is currently considered to be a practical option. An alternative has coating spread over both sides along one edge of the strips of foil, and over one side of the other edge. The edges with coating over both sides are then overlapped with the insulating separator between them. The other edge of each strip has the coating lying against the separator and this edge is then folded over the other sheet in the region of the overlap;

(d) the layered strips may be produced in a batch process to predetermined lengths. Alternatively the layered strip may be produced continuously and then cut to the required lengths. In this case it is necessary to take precautions to ensure there are no short circuits. The process produces a long length of the layered strip in which the area of overlap of the pasted areas on the electrodes is related to the length, and to the capacitance. The strip is cut, either before or after it is folded lengthways, to give the required capacitance;

(e) folding the cut length crossways to form a twice folded structure. The second fold will usually be made after the strip to cut from the long length since this makes handling easier. The second fold will also usually be made after the first fold, but it is conceivable for the layered strip to be folded crossways and then folded lengthways. The double fold gives the structure a generally thin rectangular form;

(f) impregnating the structure with electrolyte. The structure will generally be placed in a container which will become the final package before impregnating it with electrolyte. The impregnation step in itself may follow the conventional procedure used with double layer capacitors, and any suitable electrolyte may be used;

(g) in one form electrical connection terminals may be attached to the electrodes. If the two strip electrodes are longitudinally offset the terminals may be attached to respective non-overlapping ends. In an alternative, the electrodes may have lateral extensions to which the terminals are attached. In this case the extensions may extend out of opposite sides of the strip. In an alternative form the electrodes themselves may be used as electrical connectors; and (h) sealing the structure into a package. Since the structure will likely have a generally flat, rectangular shape it may conveniently be packaged into an envelope of plastics material. The envelope may be left open along one side during the impregnating step (f) and subsequently sealed.

A charge storage device having capacitance, time constant, power or energy density selected from a wide range, can be manufactured in this fashion by cutting the layered strip to different predetermined lengths. Additional flexibility is also readily available by changing the proportions of activated and conductive carbon, or the thickness of the coating layer that is applied onto the foil.

BRIEF DESCRIPTION OF THE DRAWINGS

Preferred embodiments of the invention will now be described, by way of example only, with reference to the accompanying drawings in which.

The same reference numerals have been used throughout the drawings to relate to corresponding features.

DETAILED DESCRIPTION

Figure 1A:
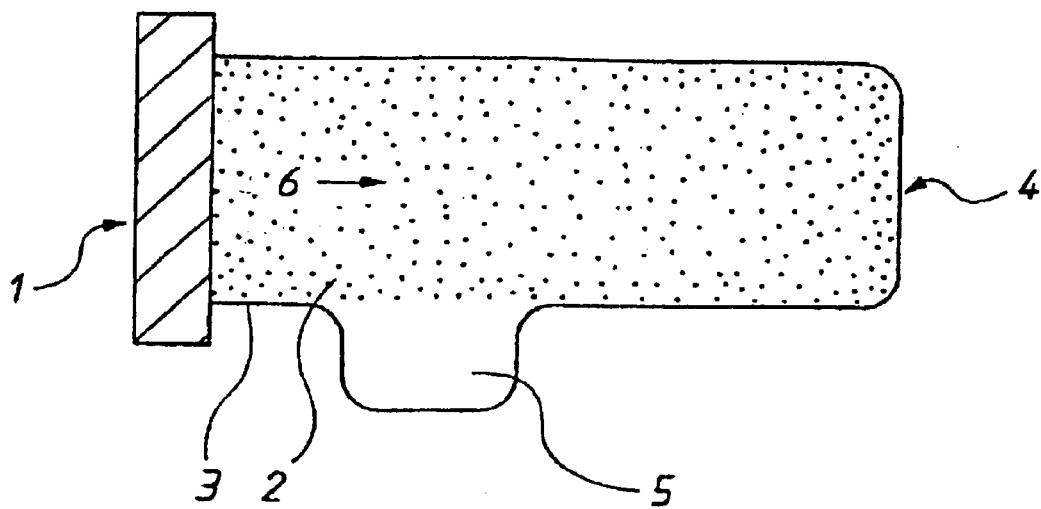
FIG. 1a is a plan view of a strip of foil emerging from a printer which is spreading paste onto the top of it.

Referring first to FIG. 1a, a printing head indicated generally at 1 spreads a paste 2 lengthways along the top of a strip of aluminium foil 3 to form a strip electrode indicated generally at 4. The strip of foil generally has straight sides one of which is interrupted by a laterally extending tab 5. The strip advances from the printing head in the direction shown by the arrow 6.

The paste is about a hundred microns thick and contains about 75% activated carbon, about 15% conductive carbon, and about 10% of a binder.

Figure 1B:
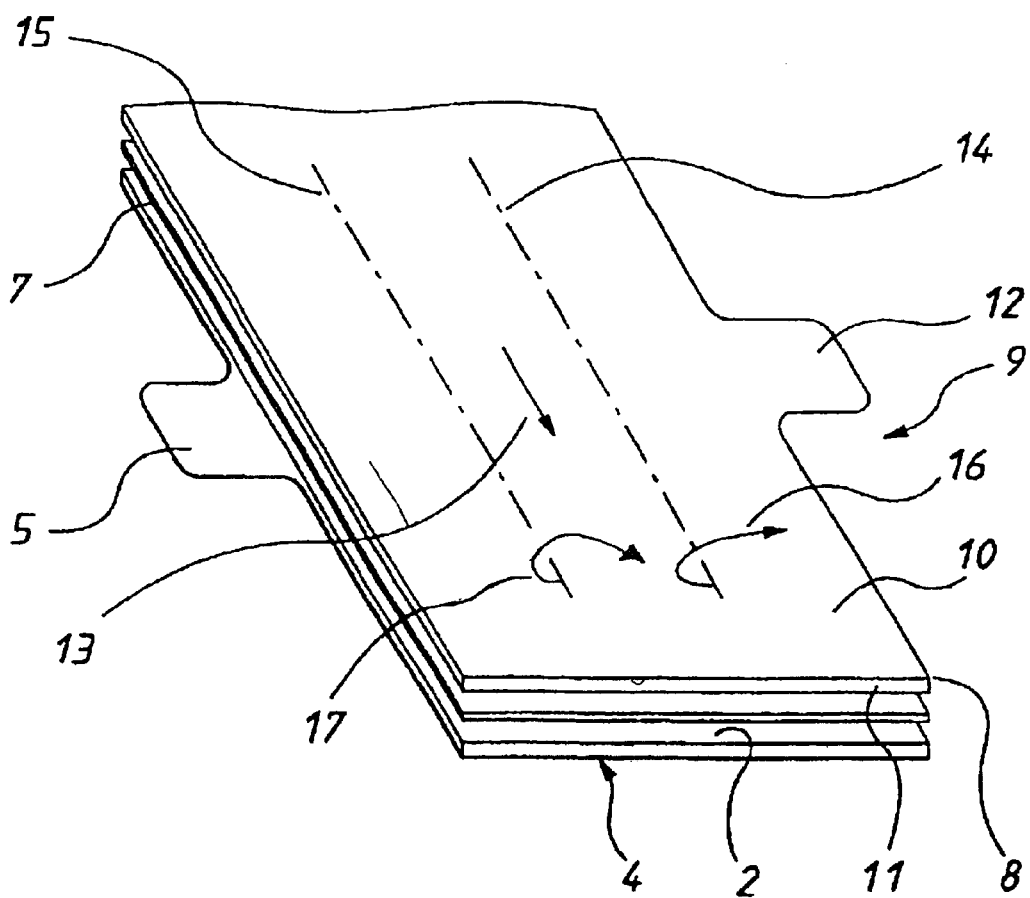
FIG. 1b is a pictorial view of an insulating separator being sandwiched between two strips of foil.

In FIG. 1b an insulating separator 7 is sandwiched between the strip electrode 4 and another similar strip electrode 8 to form a layered strip indicated generally at 9. Strip electrode 8 is similar to strip electrode 4 and has a foil back 10, a pasted region 11 and a laterally extending tab 12. Strip electrode 4 has its pasted region 2 on top and strip electrode 8 has its pasted region 11 below so that the separator is between the two pasted areas. The two strip electrodes 4 and 8 are pasted simultaneously in the configuration shown and carried by rollers (not shown) in the direction of arrow 13 onto either side of the separator 7.

The insulating separator 7 is selected from among the range of suitable materials depending of the type of electrolyte to be used. A porous membrane of plastics material is used with an organic electrolyte in this example.

Figure 1C:
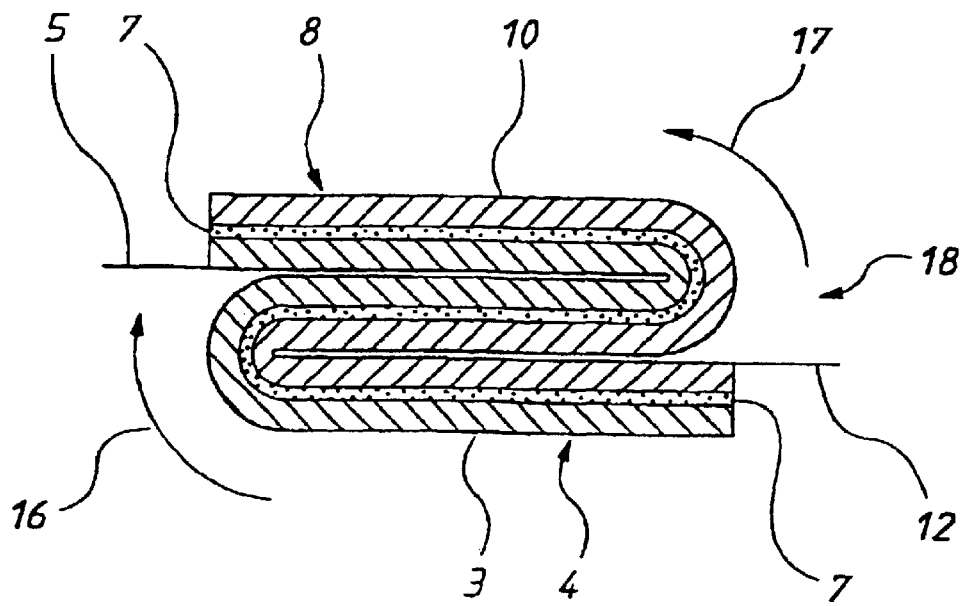
FIG. 1c is an end elevation of the sandwich after it has been folded lengthways.

The layered strip is folded lengthways along the fold lines 14 and 15, in the directions indicated by arrows 16 and 17 respectively, to form a folded layered strip 18 as shown in FIG. 1c.

Figure 1D:
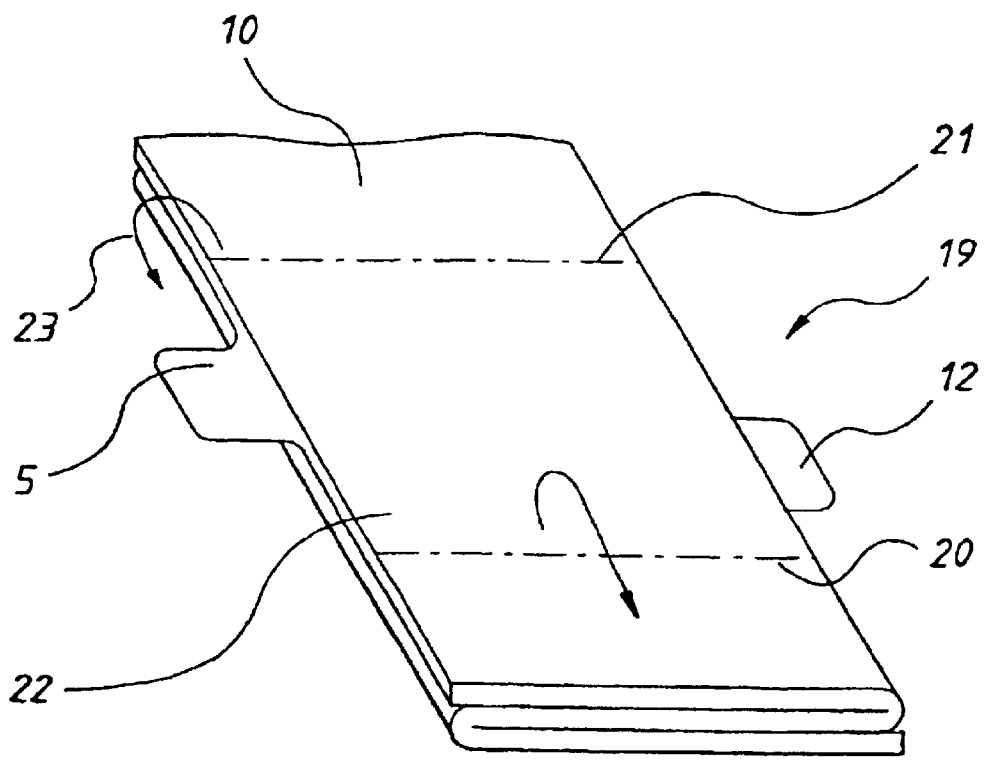
FIG. 1d is a pictorial view of the folded sandwich after it has been cut to length.

The layered strip 18 is then cut to a predetermined length 19 as shown in FIG. 1d. After the proportions of activated and conductive carbon, and the thickness of the paste, have been settled the length to which the strip 18 is cut is the final determining factor for the capacitance, time constant, power density and energy density of the final device.

Figure 1E:
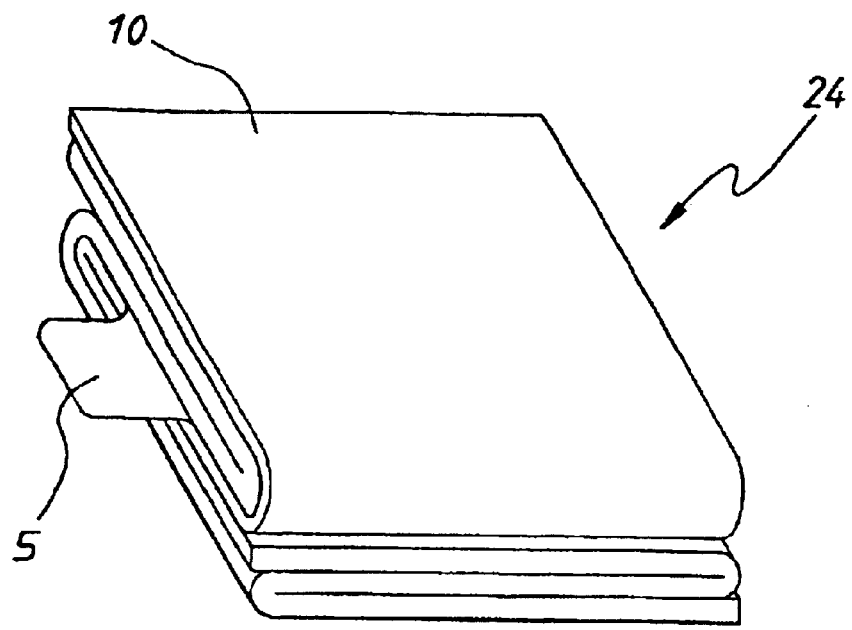
FIG. 1e is a pictorial view of cut length after it has been folded crossways.

The cut length 19 is then folded crossways along the fold lines 20 and 21 in the directions indicated by the respective arrows 22 and 23 to form a twice folded structure 24 as shown in FIG. 1e.

Figure 1F:
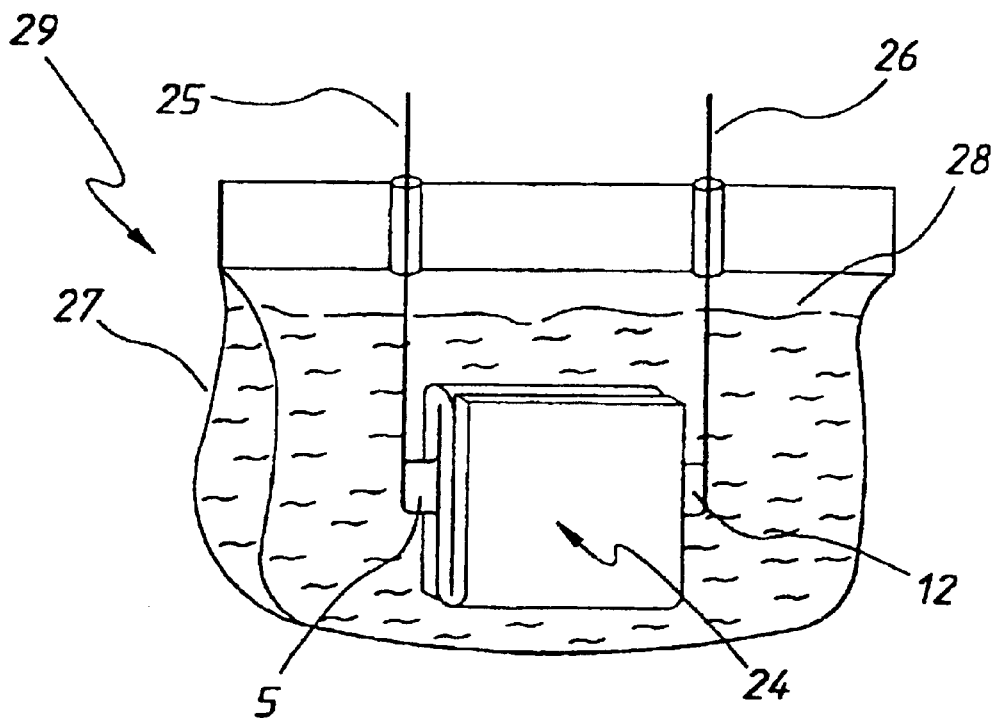
FIG. 1f is a pictorial view of a finished device with terminals attached, after it has been impregnated and sealed into a package.

Terminals 25 and 26 are attached to respective tabs 5 and 12 of the electrodes 4 and 8. The structure is then placed in a plastics envelope 27 and impregnated by electrolyte 28; all as shown in FIG. 1f. Excess electrolyte is then removed. The envelope 27 is then sealed to form a double layer capacitor 29 having a generally flat, rectangular shape.

Figure 2:
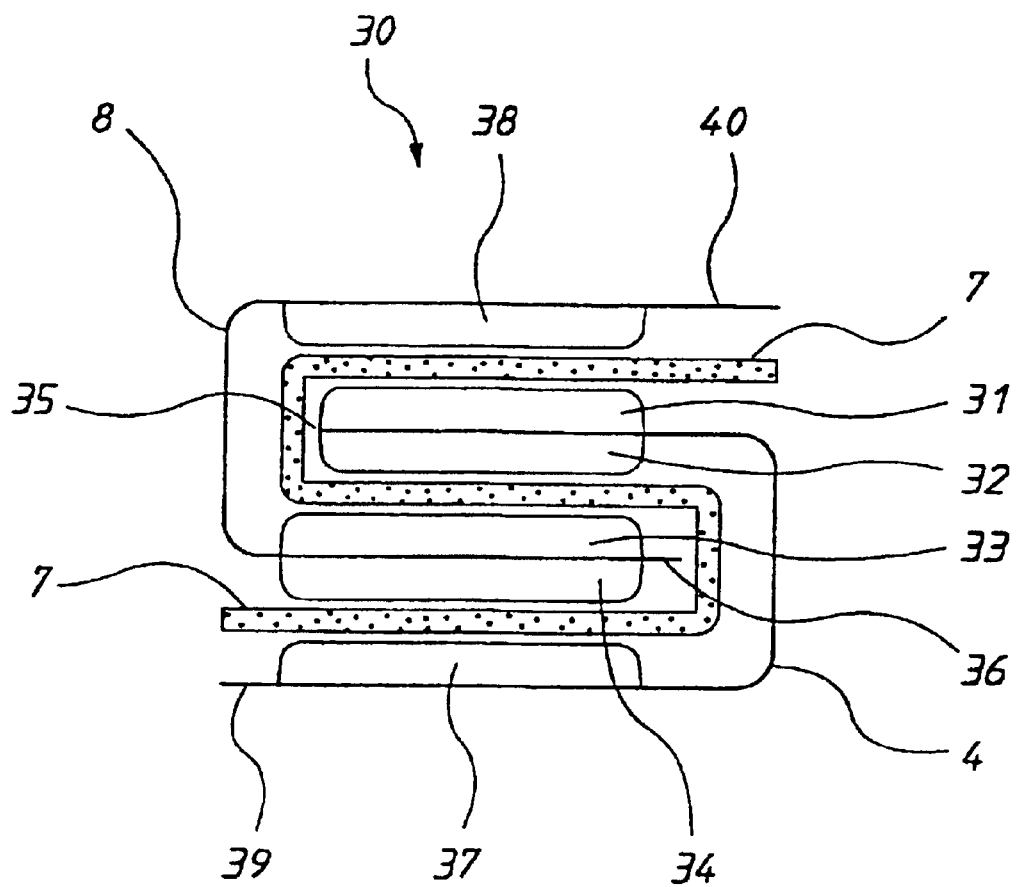
FIG. 2 is an end elevation of an alternative sandwich structure.
Figure 3:
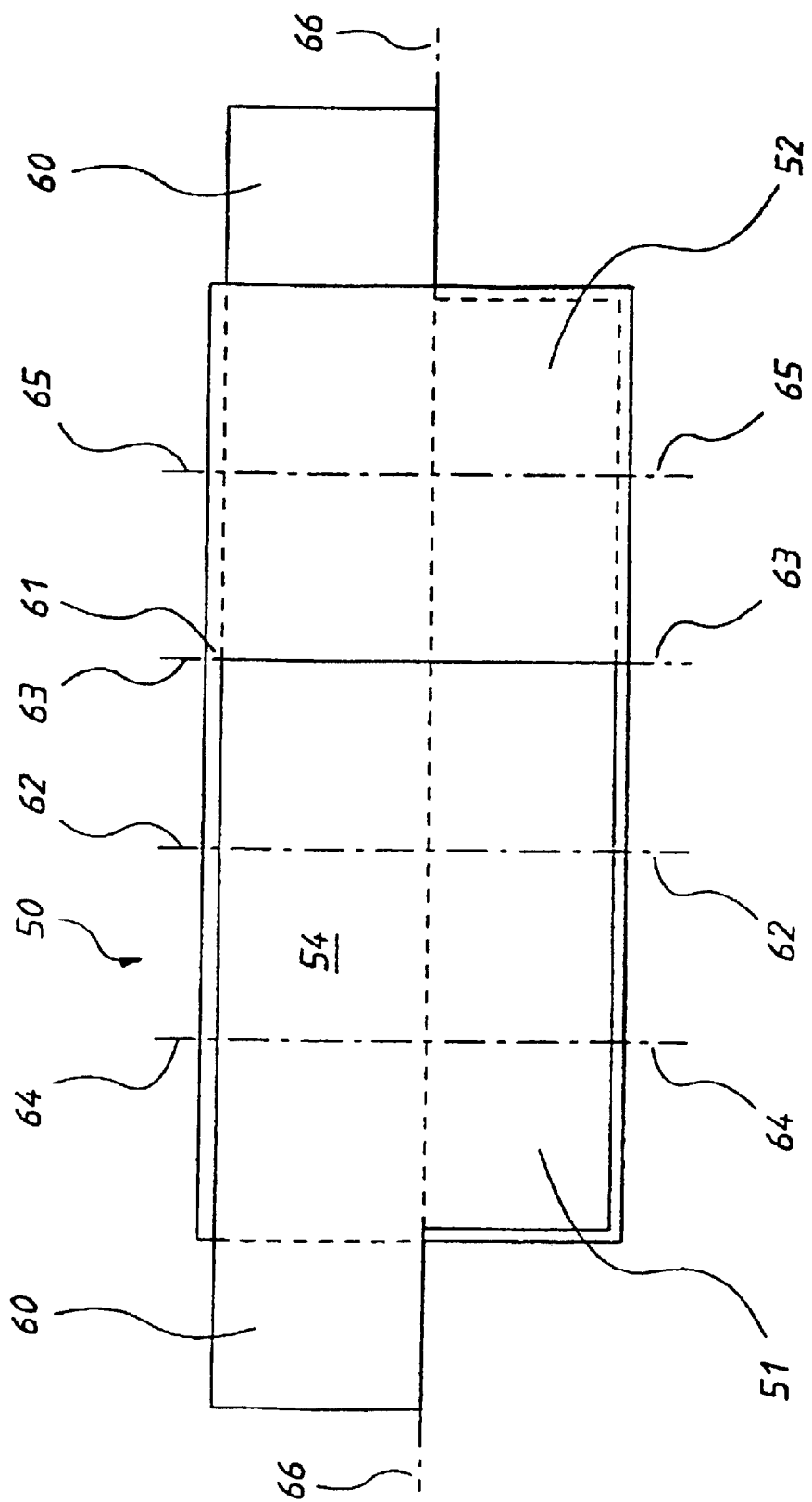
FIG. 3 is a side view of a partially assembled super capacitor according to another aspect of the invention.

In another example 30, shown in FIG. 2, the paste is spread over both sides 31 and 32, and 33 and 34, along one edge 35, and 36, of the strips of foil 4 and 8 respectively. Paste is also spread over one side 37 and 38 of the other edges 39 and 40 respectively. The edges with paste over both sides 35 and 36 are then overlapped with the insulating separator 7 between them. The other edge 39 and 40 of each strip has the paste 37 and 38 lying against the separator and these edges are then folded over the other sheet in the region of the overlap.

Figure 4:
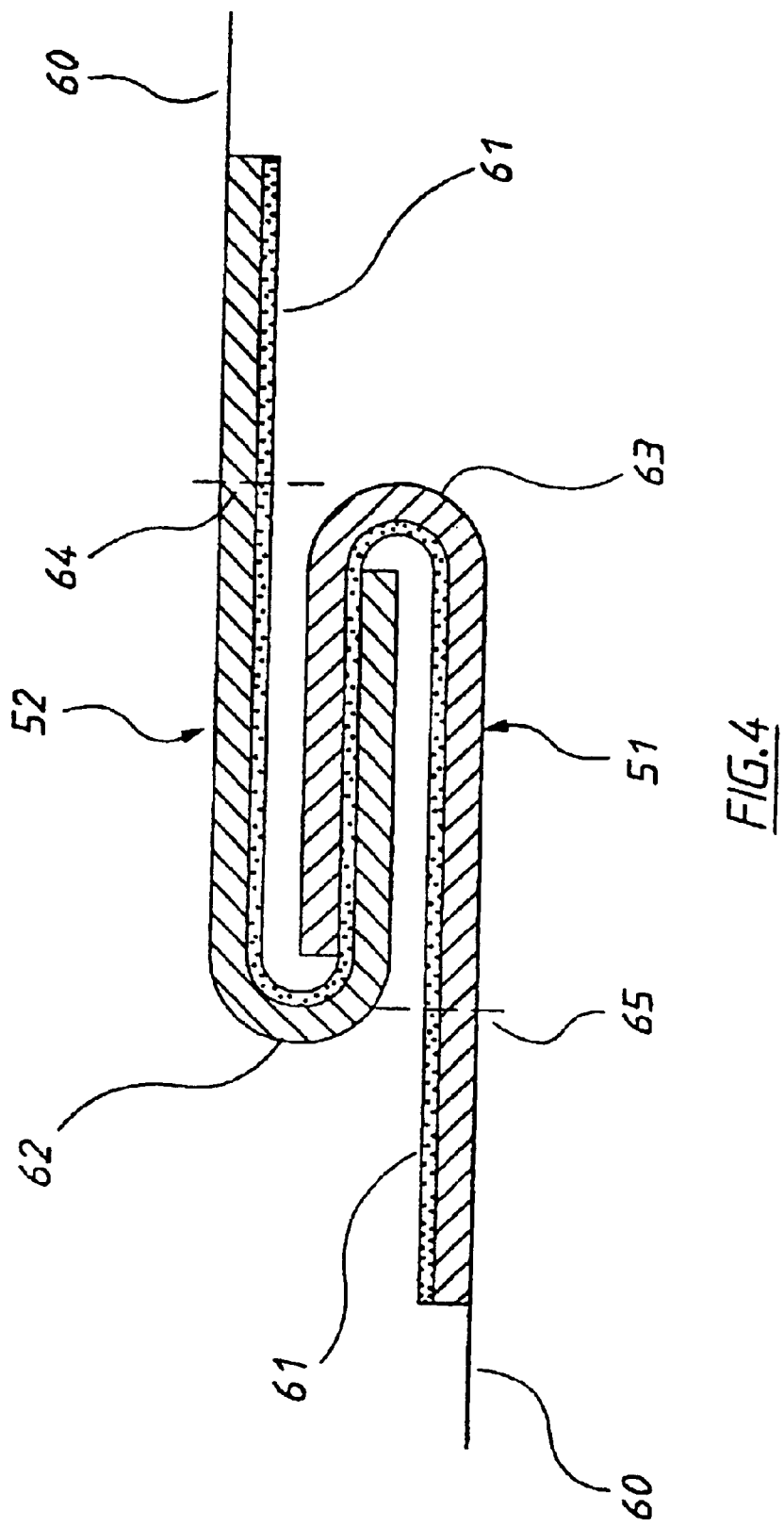
FIG. 4 is a plan view of the super capacitor of FIG. 3 after the folding along two of the transverse fold lines has occurred.
Figure 5:
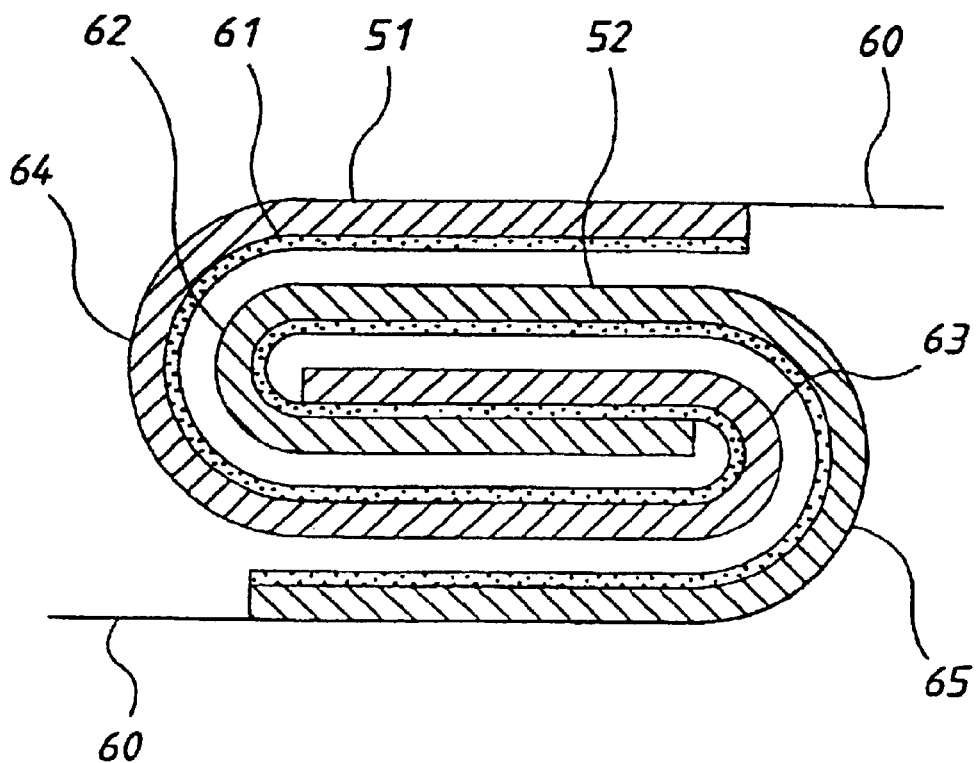
FIG. 5 is a plan view of the super capacitor of FIG. 4 after the folding along the other two transverse fold lines has occurred.
Figure 6:
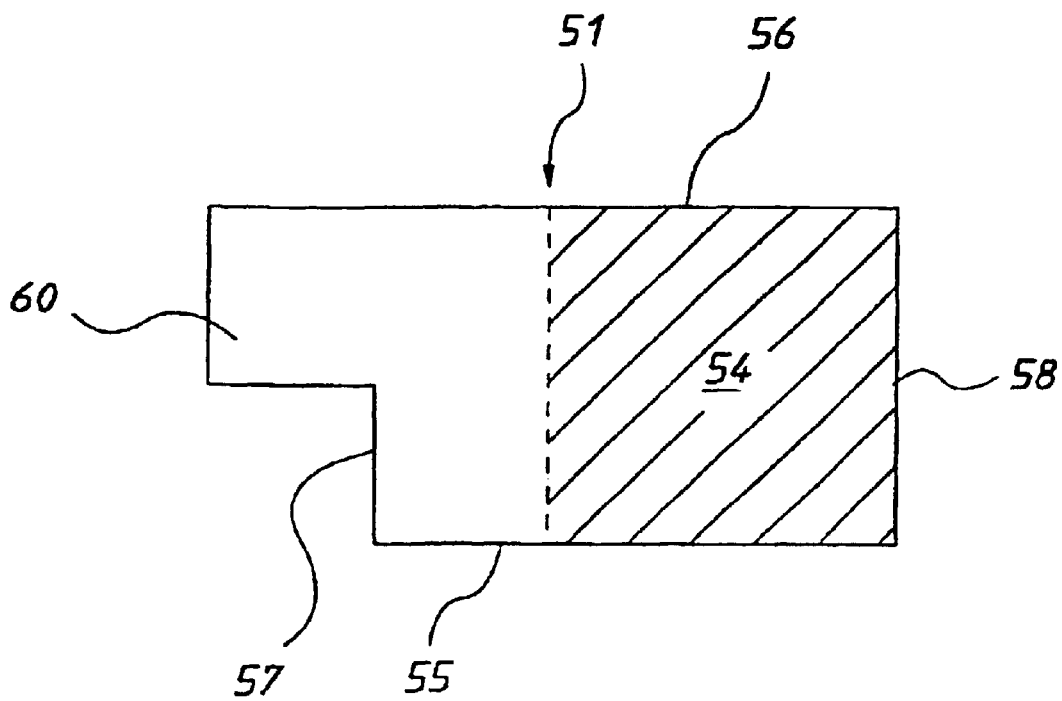
FIG. 6 is a view of one side of an electrode of the super capacitor of FIG. 3.

A further embodiment of the invention, at different stages of assembly, is schematically illustrated in FIGS. 3 to 7. More particularly, an energy storage device in the form of a super-capacitor 50 includes a pair of aluminium sheets. The pair of sheets comprises two rectangular aluminium foil electrodes 51 and 52 each having a first side 53 and an opposed second side 54. Electrode 51 is illustrated in FIG. 5 and FIG. 6. Electrodes 51 and 52 also include parallel longitudinal edges 55 and 56 and parallel transverse edges 57 and 58. In this embodiment edges 55 and 56 are about 108 mm long, and edges 57 and 58 are about 88 mm long. Each electrode includes a 36 mm×44 mm rectangular tab 60 which extends longitudinally outwardly from respective edges 57.

Figure 7:
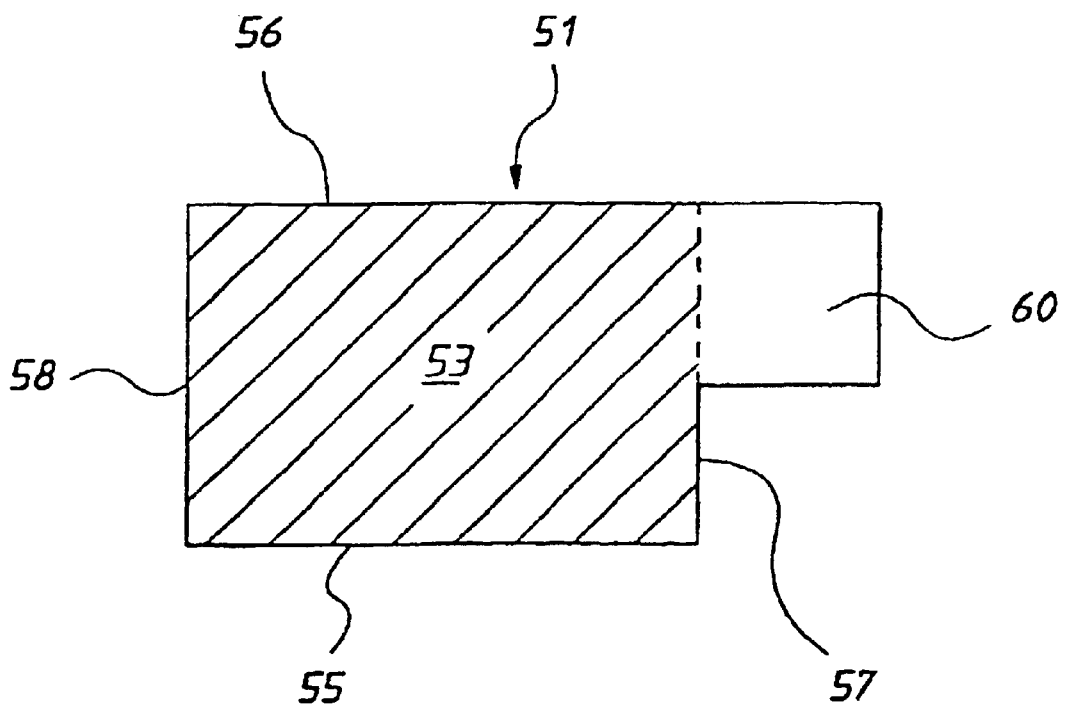
FIG. 7 is a view of the other side of the electrode of FIG. 5.

The electrodes each include a carbon coating on both sides 53 and 54. The coating is a mixture of carbon and binder and is about 12 microns thick. As best shown in FIG. 6 and FIG. 7 the coating is applied to cover side 53 completely, but only to cover two thirds of the foil on side 54. That is, the coating extends longitudinally from edge 58 and terminates about 36 mm from edge 57. The electrodes are positioned, together with a separator 61 in the configuration shown in FIG. 4. Thereafter electrode 51 and separator 61 are folded along a first transverse fold line 62 and then electrode 52 and separator 61 are folded along a second spaced apart transverse fold line 63. The resultant structure is shown in plan view in FIG. 4. This structure is then folded along a third transverse fold line 64 and a fourth transverse fold line 65 to provide the structure shown in FIG. 5. A final fold is then affected along a central longitudinal fold line 66 to provide a two electrode assembly having dimensions of about 36 mm×44 mm. Moreover, in this folded configuration tabs 60 extend outwardly from opposite sides of the assembly. It will be appreciated that the drawings, and in particular FIGS. 4 and 5, are schematic representations only which are intended to assist the reader in understanding the invention. In practice the adjacent electrodes and separator in FIGS. 4 and 5 are abutted and the resultant structure is flat.

This assembly is then soaked in an electrolyte consisting of tetraethylammonium tetrfluoroborate dissolved in a mixture of ethylene carbonate and dimethyl carbonate. The resultant super capacitor has an esr of 15 mohm and a capacitance of 3.8 F. measured using a 2 Amp constant current discharge.

Four of the super capacitors referred to above are connected in series and disposed within a single sealed package. The tabs 60 of the outermost capacitors are electrically connected to respective terminals which are accessible from outside the package. A combination super capacitor has an operating voltage of about 8 Volts. In other embodiments, however, the operating voltage is about 10 Volts.

Although the invention has been described with reference to particular examples, it should be appreciated that it may be exemplified in many other ways. For instance, any suitable combination of separator, electrolyte and casing may be used as well as those particularly mentioned. Also any terminal arrangement may be used, and any convenient sealing method may be employed.

What is claimed is:

1. A charge storage device including:
    a first longitudinally extending sheet electrode;
    a second longitudinally extending sheet electrode disposed at least partially overlapping with and adjacent to the first electrode;
    wherein the second electrode is folded together with the first electrode along at least one longitudinal electrode fold line and along at least one transverse electrode fold line;
    a porous separator disposed between the at least partially overlapping and adjacent electrodes; and
    a sealed package for containing the electrodes, the separator and an electrolyte, whereby the first electrode is electrically connected to a first terminal and the second electrode is electrically connected to a second terminal, both the first and second terminals extending from the package to allow electrical connection to the respective electrodes.

2. A device according to claim 1 wherein the longitudinal electrode fold line extends along both the first and second electrodes.

3. A device according to claim 2 wherein the transverse electrode fold line extends along both the first and second electrodes.

4. A device according to claim 1 wherein the transverse electrode fold line extends along both the first and second electrodes.

5. A device according to claim 1 wherein the first and second electrodes are folded together along a plurality of spaced apart longitudinal electrode fold lines and a plurality of spaced apart transverse electrode fold lines.

6. A device according to claim 5 wherein at least two of the plurality of spaced apart longitudinal electrode fold lines extend along both the first and second electrodes.

7. A device according to claim 6 wherein at least two of the plurality of spaced apart transverse electrode fold lines extend along both the first and second electrodes.

8. A device according to claim 5 wherein at least two of the plurality of spaced apart transverse electrode fold lines extend along both the first and second electrodes.

9. A device according to claim 1 wherein the first and second electrodes are folded together along a plurality of spaced apart longitudinal electrode fold lines.

10. A device according to claim 1 wherein the first and second electrodes are folded together along a plurality of spaced apart transverse electrode fold lines.

11. A device according to claim 9 wherein the plurality of spaced apart longitudinal electrode fold lines are along both of the electrodes.

12. A device according to claim 10 wherein the plurality of spaced apart transverse electrode fold lines are along both of the electrodes.

13. A device according to claim 1 wherein the first electrode is folded in a Z configuration.

14. A device according to claim 1 wherein the second electrode is folded in a Z configuration.

15. A device according to claim 1 wherein the first and second electrodes are folded in a Z configuration.

16. A device according to claim 1 wherein a plurality of like pairs of first and second sheet electrodes, together with the intermediate separators, are disposed within the package and connected in parallel to the first and second terminals.

17. A device according to claim 1 wherein the first and the second sheet electrodes include respective outwardly extending tabs which are electrically connected to the respective first and second terminals.

18. A device according to claim 17 wherein the tabs extend transversely outwardly from the respective electrodes.

19. A device according to claim 18 wherein the respective tabs extend outwardly away from each other.

20. A device according to claim 17 wherein each electrode includes two longitudinal edges and two transverse edges extending between the longitudinal edges wherein the tabs extend centrally outwardly from one of the respective longitudinal edges.

21. A device according to claims 1, wherein the overlapping disposition of the electrodes is substantially complete.

22. A method of manufacturing a charge storage device including the steps of:
providing a first longitudinally extending sheet electrode;
disposing a second longitudinally extending sheet electrode at least partially overlapping with and adjacent to the first electrode;
disposing a porous separator between the at least partially overlapping and adjacent electrodes;
folding the second electrode together with the first electrode along at least one longitudinal electrode fold line and along at least one transverse electrode fold line; and
sealing the electrodes, the separator and an electrolyte in a package such that the first electrode is electrically connected to a first terminal and the second electrode is electrically connected to a second terminal, whereby both the first and second terminals extend from the package to allow electrical connection to the respective electrodes.

23. A method according to claim 22 wherein the longitudinal electrode fold line extends along both the first and second electrodes.

24. A method according to claim 23 wherein the transverse electrode fold line extends along both the first and second electrodes.

25. A method according to claim 22 wherein the transverse electrode fold line extends along both the first and second electrodes.

26. A method according to claim 22 including the step of folding the first and second electrodes together along a plurality of spaced apart longitudinal electrode fold lines and a plurality of spaced apart transverse electrode fold lines.

27. A method according to claim 26 wherein at least two of the plurality of spaced apart longitudinal. electrode fold lines extend along both the first and second electrodes.

28. A method according to claim 27 wherein at least two of the plurality of spaced apart transverse electrode fold lines extend along both the first and second electrodes.

29. A method according to claim 26 wherein at least two of the plurality of spaced apart transverse electrode fold lines extend along both the first and second electrodes.

30. A device according to claim 22 wherein one of the following: the first electrode is folded in a double Z configuration, and the second electrode is folded in a double Z configuration.

31. A method according to claim 22 wherein the first electrode is folded in a Z configuration.

32. A method according to claim 22 wherein the second electrode is folded in a Z configuration.

33. A method according to claim 22 wherein the first and second electrodes are folded in a Z configuration.

34. A method according to claim 22 wherein a plurality of like pairs of first and second sheet electrodes, together with the intermediate separators, are disposed within the package and connected in parallel to the first and second terminals.

35. A method according to claim 22 wherein the first and the second sheet electrodes include respective outwardly extending tabs which are electrically connected to the respective first and second terminals.

36. A method according to claim 35 wherein the tabs extend transversely outwardly from the respective electrodes.

37. A method according to claim 36 wherein the respective tabs extend outwardly away from each other.

38. A method according to claim 35 wherein each electrode includes two longitudinal edges and two transverse edges extending between the longitudinal edges wherein the tabs extend centrally outwardly from one of the respective longitudinal edges.

39. A method according to claim 22 wherein the overlapping disposition of the electrodes is substantially complete.

40. A charge storage device including:
a first longitudinally extending sheet electrode;
a second longitudinally extending sheet electrode disposed adjacent to the first electrode and being folded together with the first electrode along a longitudinal fold line and a transverse fold line;
a porous separator disposed between adjacent electrodes; and
a sealed package for containing the electrodes, the separator and an electrolyte, whereby the first electrode is electrically connected to a first terminal and the second electrode is electrically connected to a second terminal, both the first and second terminals extending from the package to allow electrical connection to the respective electrodes.

41. A device according to claim 40 wherein at least one of the fold lines is common to both electrodes.

* * * * *

UNITED STATES PATENT AND TRADEMARK OFFICE
CERTIFICATE OF CORRECTION

PATENT NO. : 6,740,447 B1
DATED : May 25, 2004
INVENTOR(S) : Sarkis Minas Keshishian It is certified that error appears in the above-identified patent and that said Letters Patent is hereby corrected as shown below:

Column 1,
Line 21, after "respective" delete ",".

Column 8,
Line 6, change "longitudinal . Electrode" to -- longitudinal electrode --.

Signed and Sealed this

Twenty-first Day of September, 2004

JON W. DUDAS
*Director of the United States Patent and Trademark Office*